United States Patent
Iacono et al.

(10) Patent No.: US 7,058,032 B2
(45) Date of Patent: Jun. 6, 2006

(54) SCHEDULING DATA TRANSMISSION BY MEDIUM ACCESS CONTROL (MAC) LAYER IN A MOBILE NETWORK

(75) Inventors: Ana Lucia Iacono, Garden City, NY (US); Nihar Anikumar Doshi, Lindenhurst, NY (US); Sasidhar Movva, West Babylon, NY (US); Janet Stern-Berkowitz, Little Neck, NY (US); Gary Schnee, Hauppauge, NY (US); Stephen E. Terry, Northport, NY (US); Guodong Zhang, Patchogue, NY (US)

(73) Assignee: InterDigital Technology, Wilmington, DE (US)

( * ) Notice: Subject to any disclaimer, the term of this patent is extended or adjusted under 35 U.S.C. 154(b) by 177 days.

(21) Appl. No.: 10/742,539

(22) Filed: Dec. 19, 2003
(Under 37 CFR 1.47)

(65) Prior Publication Data

US 2004/0185892 A1 Sep. 23, 2004

Related U.S. Application Data

(60) Provisional application No. 60/435,842, filed on Dec. 20, 2002.

(51) Int. Cl.
*H04Q 7/00* (2006.01)

(52) U.S. Cl. .................................. 370/329; 370/459
(58) Field of Classification Search .................. None
See application file for complete search history.

(56) References Cited

U.S. PATENT DOCUMENTS

| | | | |
|---|---|---|---|
| 6,510,137 B1 | 1/2003 | Belaiche | |
| 6,519,461 B1 | 2/2003 | Andersson et al. | |
| 6,636,496 B1 | 10/2003 | Cho et al. | |
| 6,675,016 B1 | 1/2004 | Lucidarme et al. | |
| 6,813,284 B1 * | 11/2004 | Vayanos et al. | 370/537 |
| 6,868,257 B1 * | 3/2005 | Holma | 455/63.1 |
| 6,882,857 B1 * | 4/2005 | Zhang et al. | 455/522 |
| 2002/0021714 A1 * | 2/2002 | Seguin | 370/469 |
| 2003/0123396 A1 * | 7/2003 | Seo et al. | 370/252 |

\* cited by examiner

*Primary Examiner*—Bob A. Phunkulh
(74) *Attorney, Agent, or Firm*—Volpe & Koeing, P.C.

(57) ABSTRACT

A method and strategy for transport format combination (TFC) selection and related algorithms in wireless communications. The method provides procedures used by the MAC layer in both the UE and the RNC to schedule data transmission. In the inventive method, each time the maximum transmit power is reached in a time slot, the physical layer will send a notification to the MAC layer, including the time slot number where maximum power was reached. The invention provides a low cost method and algorithm avoiding the need for the MAC to determine the power needed by each TFC in each time slot.

29 Claims, 9 Drawing Sheets

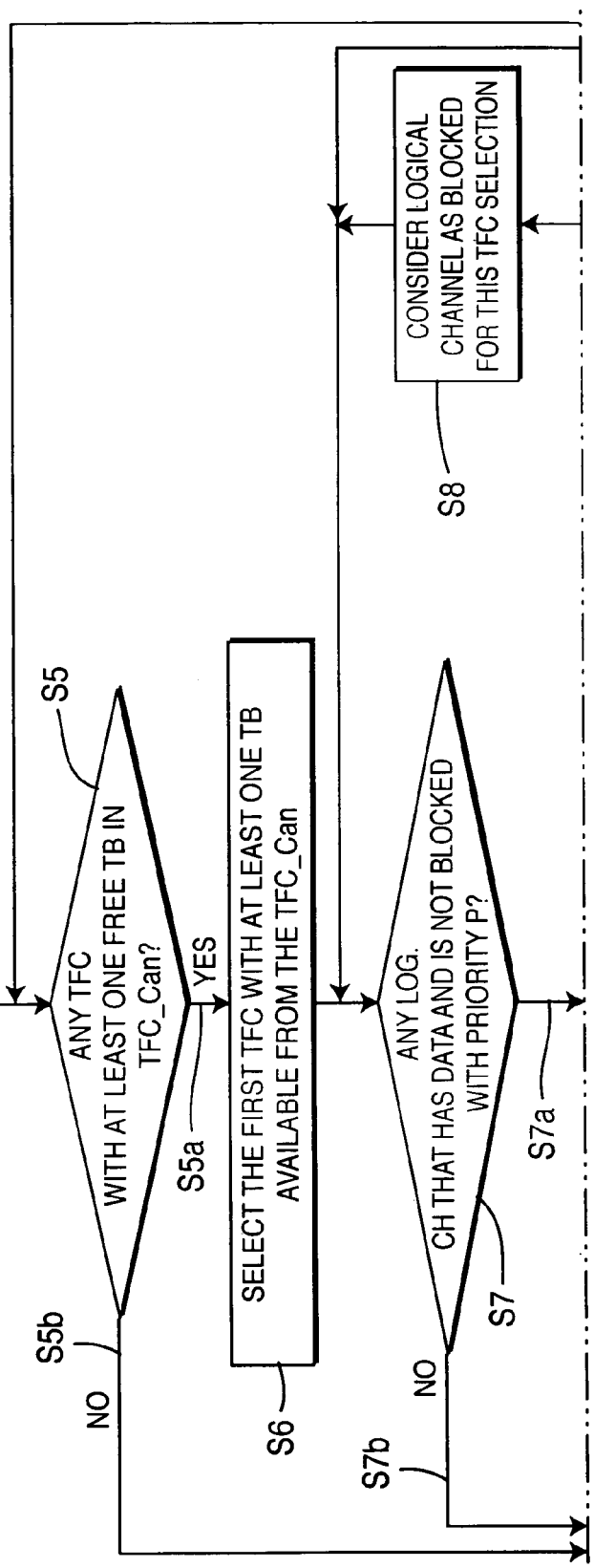

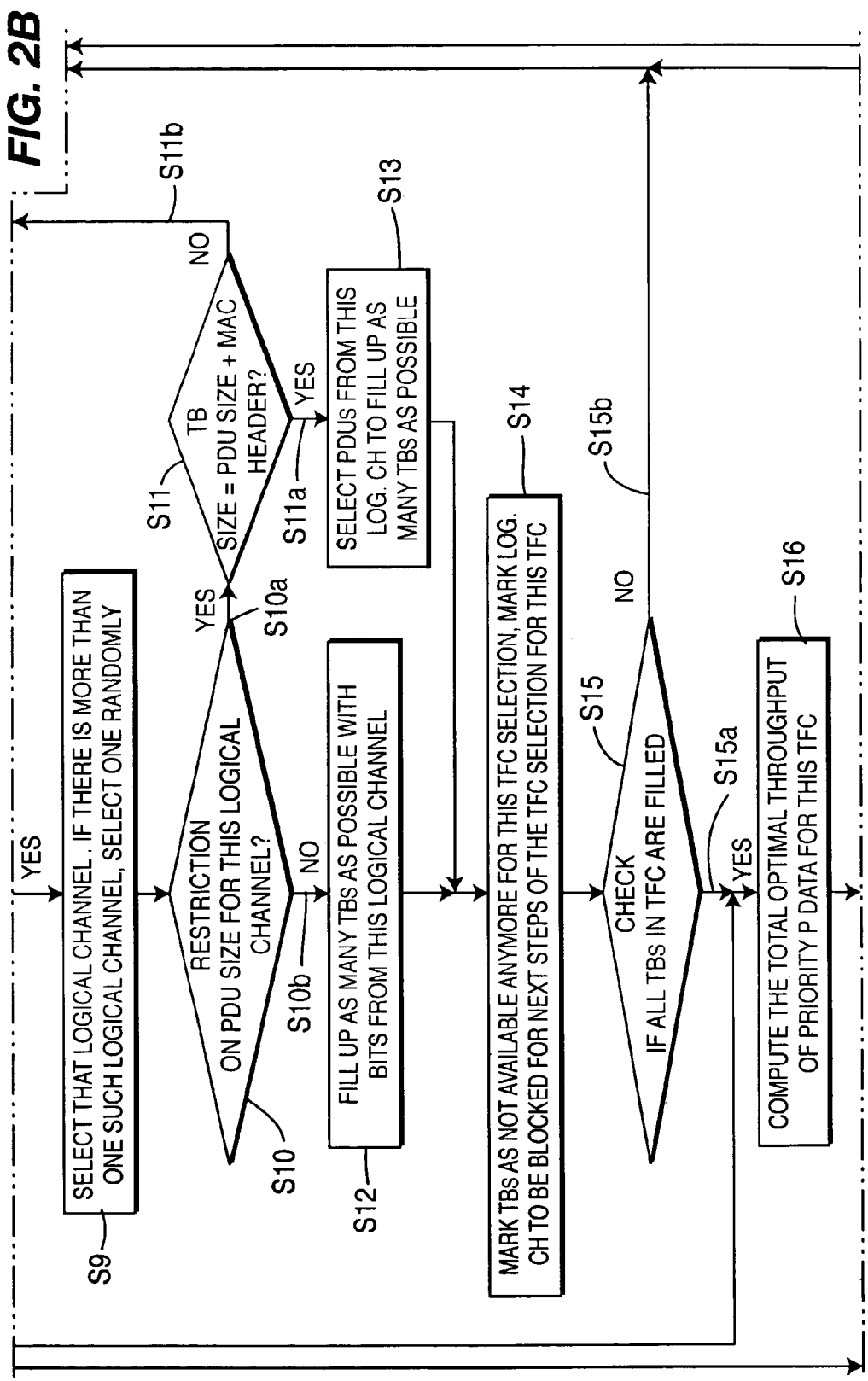

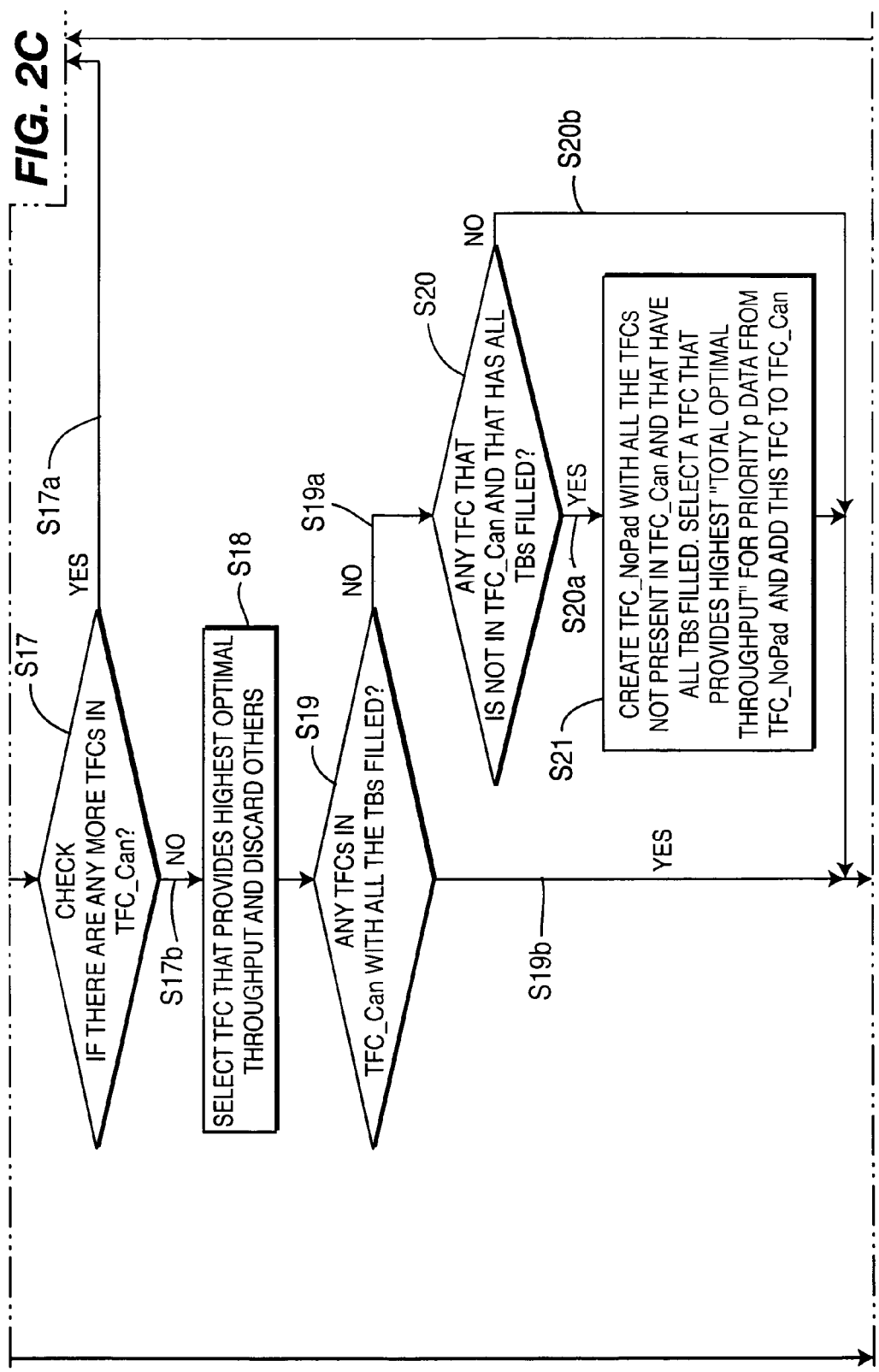

Figure 1A:
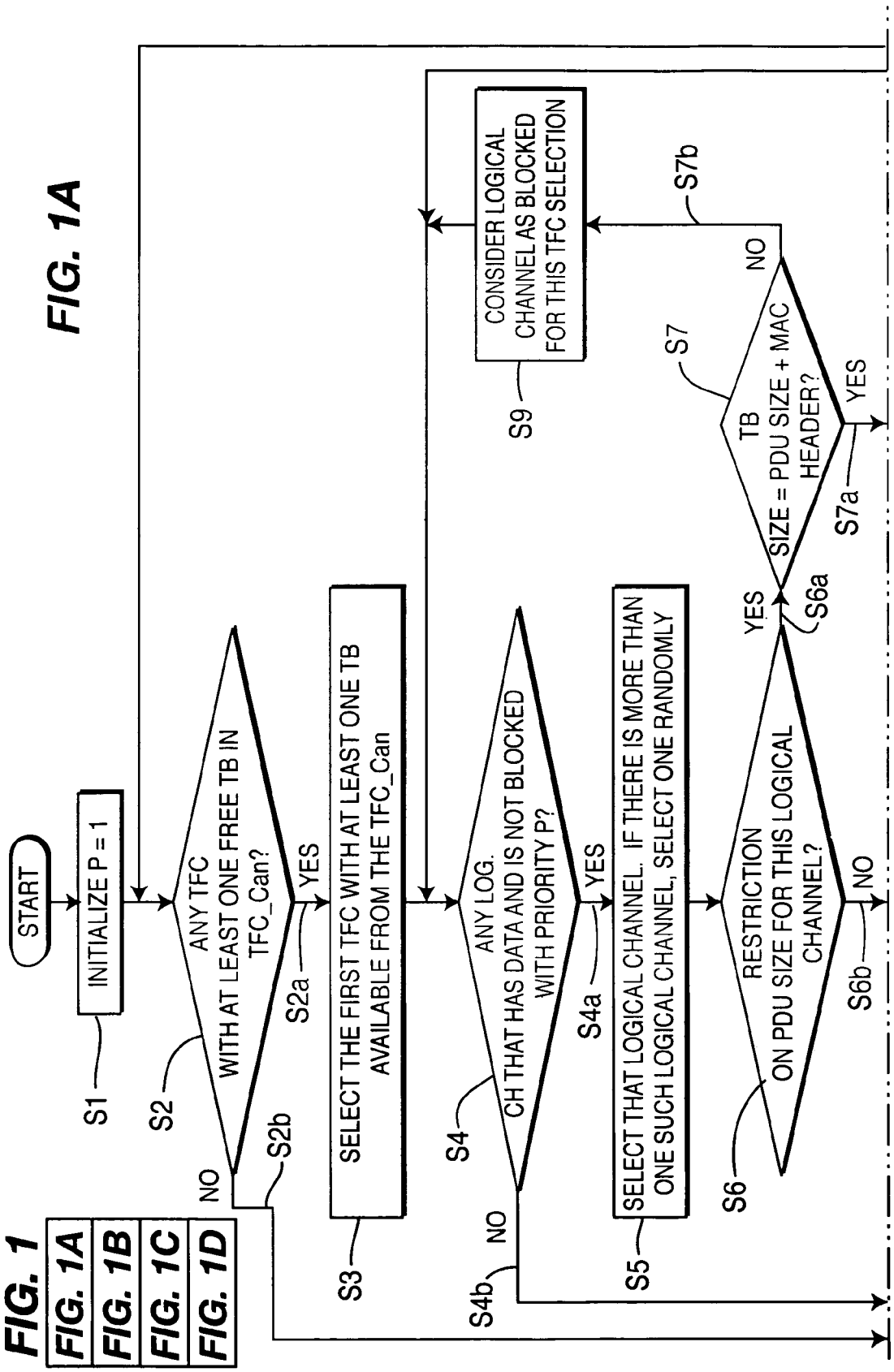
Figure 1B:
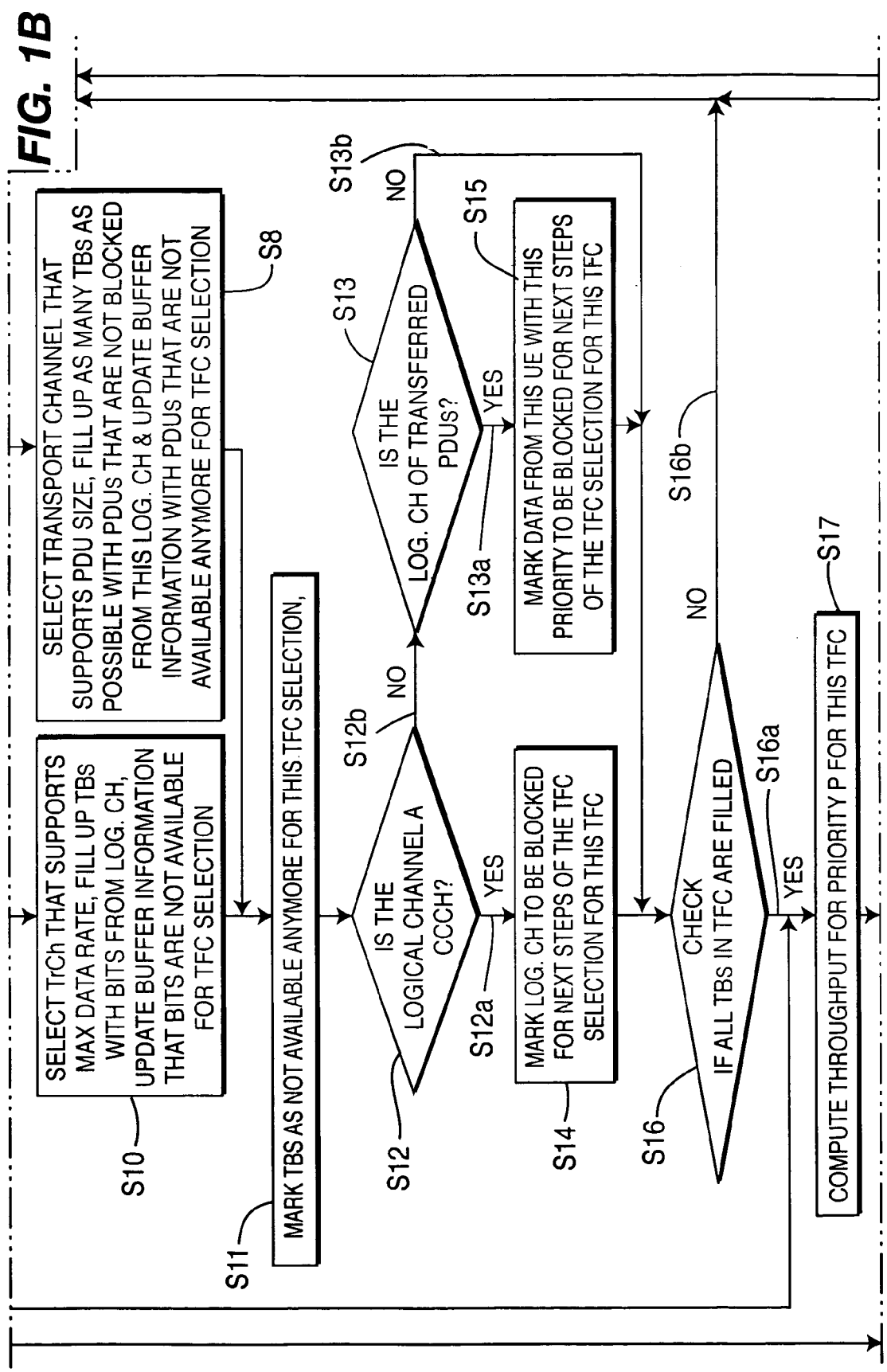
Figure 1C:
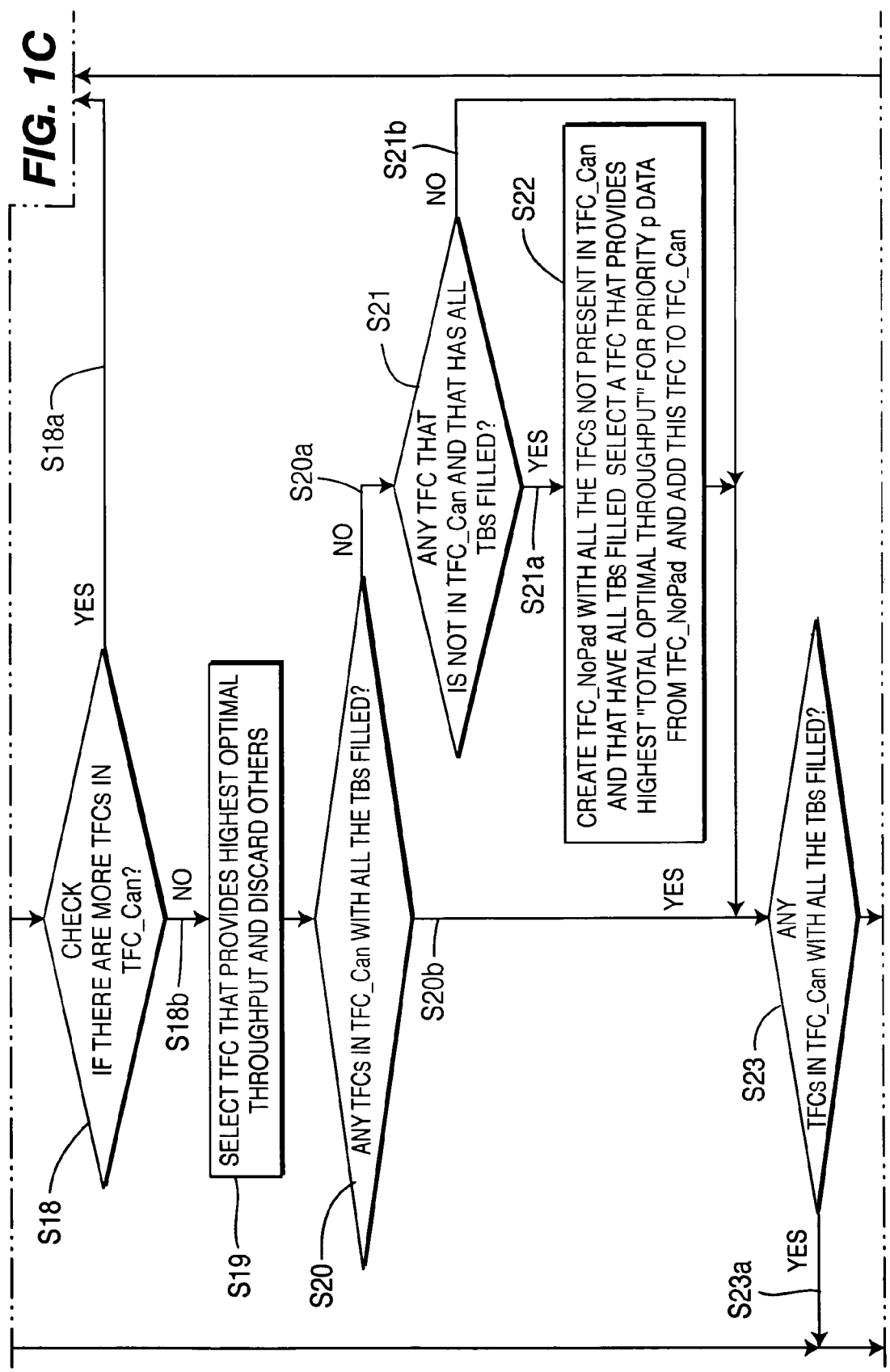

SCHEDULING DATA TRANSMISSION BY MEDIUM ACCESS CONTROL (MAC) LAYER IN A MOBILE NETWORK

CROSS REFERENCE TO RELATED APPLICATION(S)

This application claims priority from U.S. provisional application No. 60/435,842 filed Dec. 20, 2002, which is incorporated by reference as if fully set forth.

FIELD OF INVENTION

This invention generally relates to the procedures used by the MAC Layer to schedule data transmission. More particularly, the invention relates to method and algorithm for data transmission in a UMTS network.

BACKGROUND

In a third generation partnership project universal mobile telecommunications system (3GPP UMTS), the MAC layer in the user equipment (UE) and in the Radio Network Controller (RNC) is responsible for scheduling of data transmission in the uplink and downlink, respectively. Transport channels form the interface between the MAC layer and the physical layer. In the physical layer, a set of transport channels is combined to form a Coded Composite Transport Channel (CCTrCH).

A Transport Format Combination Set (TFCS) is defined for each CCTrCH. Each Transport Format Combination (TFC) defines a Transport Format (TF) for each transport channel of the CCTrCH. The TF defines the data rate of a transport channel by setting the Transmission Time Interval (TTI) (in ms), the Transport Block (TB) size (in bits) and the Transport Block Set (TBS) size (in number of blocks).

A TB is the basic unit exchanged between the MAC and physical layers. A TBS is defined as a set of TBs, which are exchanged between physical and MAC layers at the same time and using the same transport channel. The TTI is defined as the inter-arrival time of TBSs. A TTI is equal to the periodicity at which a TBS is transferred from the MAC to the physical layer and then by the physical layer onto the radio interface.

The MAC gets data from the radio link control (RLC) layer. The interface between the MAC layer and the RLC layer is formed by logical channels, or radio bearers (RB). Each transport channel can carry more than one RB. The RLC maintains a buffer for each RB; each buffer contains a set of RLC service data units (SDUs). Some RLC configurations (but not all) allow the segmentation of SDUs into protocol data units (PDUs), some allow the concatenation of SDUs to build PDUs and some allow the use of padding PDUs. In the MAC layer, a MAC header may be added to the PDU to form a TB.

The MAC layer selects the PDU sizes for a given TTI and requests these PDUs from the RLC layer. The RLC then segments and/or concatenates the SDUs in order to satisfy the MAC request. The MAC then builds the TBs and sends the TBs to the physical layer to be sent over the air in the next TTI.

At the UE side, in order to perform TFC selection, there are some standard requirements that must be followed by the UE. These requirements are summarized below.

It is desirable to provide a method for TFC selection, obviating the need for the MAC to have to determine the power needed by each TFC in each time slot.

SUMMARY

This invention provides a method and an algorithm for TFC selection wherein the need for the MAC to determine the power needed by each TFC in each time slot is obviated. The following description sets forth the MAC procedure to schedule data transmission wherein the scheduling may involve the selection of a TFC to be used and the selection of RBs to be serviced.

Both UE and Serving-RNC (S-RNC) sides of a universal mobile telecommunication service (UMTS)—time division duplex (TDD) network are discussed. In particular, the strategies for the TFC selection and related algorithms are presented.

Before selecting a TFC, a set of valid TFCs must be established. This set is referred to as the candidate set. All TFCs in the candidate set must generally satisfy the following six (6) rules: 1) belong to the TFCS; 2) not carry more bits than can be transmitted in a TTI; 3) respect the TTI compatibility (i.e., the TF of a TrCH cannot change in the middle of the TTI of the TrCH); 4) not be in the blocked state, as defined below; 5) be compatible with the RLC configuration; and 6) not require RLC to produce padding PDUs. If all TFCs in the TFCS require padding PDUs, this last requirement can be ignored. The present invention provides solutions for the last three (3) requirements.

The blocking criterion is defined as follows:

In the case of a single CCTrCH or multiple CCTrCHs having mutually exclusive timeslot assignments, the UE considers the blocking criterion for a given TFC of a CCTrCH to be fulfilled if, for three (3) successive frames, the estimated UE transmit power is greater than the maximum UE transmitter power for at least one timeslot associated with the CCTrCH in each frame.

In the case of multiple CCTrCHs that do not have mutually exclusive timeslot assignments, if, for a given CCTrCH for three (3) successive frames, the estimated UE transmit power is greater than the maximum UE transmitter power for at least one timeslot associated with the CCTrCH in each frame, the UE considers the blocking criterion for a given TFC to be fulfilled if the use of this TFC will cause the estimated UE transmit power to continue to be greater than the maximum UE transmitter power in at least one timeslot associated with the CCTrCH.

As to the unblocking criterion, the UE must not consider the unblocking criterion for a given TFC (that has been blocked) to be fulfilled until the use of this TFC will not cause the estimated UE transmit power to be greater than the maximum UE transmitter power for all uplink (UL) timeslots associated with the TFC for a minimum of three (3) successive frames. The number of said successive frames may be greater than or lesser than three (3) without departing from the spirit and scope of the invention. For example, the number of successive frames could be as few as two (2) or four (4) or more, with three (3) consecutive frames being preferred. This is also the case for all subsequent criteria for non-mutually exclusive timeslot arrangements for UEs and S-RNCs.

The MAC is divided in MAC-c and MAC-d. MAC-c is responsible for common channels and MAC-d is responsible for dedicated channels. On the UE side, there is a single TFC defined for the common channel, and thus TFC selection does not apply in UE MAC-c. On the RNC side, TFC selection is done in MAC-c and MAC-d.

The RLC configuration plays an important role during TFC selection. Depending on the amount of data available for transmission, some TFCs in the TFCS may not conform to the RLC configuration.

Padding compatibility (i.e., need for padding PDUs) is an RLC configuration issue. To check for padding compatibility one needs to check if a TFC requires padding PDUs from a transport channel that only carries logical channels that cannot provide padding PDUs, (i.e., logical channels in RLC-TM (transparent mode)). If so, then the TFC is incompatible with the RLC configuration and is considered invalid.

Note that there are other requirements related to the RLC configuration. However, in the present invention, these requirements are checked during the TFC selection procedure itself. Because the TFC selection procedure maximizes the throughput of the high priority data, the TFC selection procedure is performed in order of logical channel priority, and not per transport channel. Thus, if the padding compatibility requirement were not satisfied, the whole procedure would need to be repeated (without the selected TFC) in order to obtain a valid TFC. That is why padding compatibility is checked before performing TFC selection, thereby reducing the TFC candidate set.

The check for padding PDU compatibility must preferably be done for every TFC, based on the buffer occupancy of the logical channels mapped to that transport channel and the TF for that transport channel. The check for padding PDU compatibility is performed only in logical channels configured for transparent mode (RLC-TM)

The TF determines the number of TBs and the TB size needed. The first step is to determine how many PDUs can be generated by all logical channels in that transport channel. This determination must consider the TB size and if segmentation is allowed or not in each logical channel, and comprises the following steps:

a. If segmentation is allowed in the logical channel, then calculate n: where n=SDUsize/TBsize, and check if n is an integral number (which means that the number of PDUs multiplied by the PDU size is equal to the SDU size).

i. if yes, then the number of PDUs for that logical channel is equal to n
      ii. if no, then the number of PDUs for that logical channel is equal to zero.
    b. If segmentation is not allowed, check if the SDU size is equal to the TB size.
      i. if yes, the number of PDUs for that logical channel is equal to the total number of SDUs in that logical channel available for transmission
      ii. if no, the number of PDUs for that logical channel is equal to zero.

The number of PDUs for that transport channel is determined by summing the number of PDUs for each logical channel mapped to that transport channel.

The TFC can be supported in terms of padding PDUs if the number of PDUs for that transport channel is greater than or equal to the number of TBs in the TF.

The idea of a minimum TFC set proposed in the standards and used in this invention is explained hereinafter. The minimum TFC set is the set that allows the transmission of one TB of the highest priority transport channel that has data to be sent. The minimum TFC set includes all TFCs that have a "minimum size compatible TF" for one transport channel and empty TFs for all other transport channels, where the "minimum size compatible TF" is defined as:

For acknowledge mode—RLC (AM-RLC) logical channels, the "minimum size compatible TF" is the TF with one TB with "RLC Size" equal to the RLC PDU size.

For non-segmented Transparent Mode (TM-RLC) logical channels, the "minimum size compatible TF" is the TF with one transport block with "RLC Size" equal to the RLC SDU size considered.

For segmented mode TM-RLC, the "minimum size compatible TF" is the TF such that the number of transport blocks multiplied by the "RLC Size" is equal to the RLC SDU size considered.

For Unacknowledge Mode (UM-RLC), the "minimum size compatible TF" is the TF with a single transport block (of any size since there is no restriction on PDU size for UM). If there is more than one TFs with a single transport block defined, the "minimum size compatible TF" is the one with minimum transport block size.

In the present invention, every time the maximum transmit power is reached in a timeslot, the physical layer sends a notification along with the timeslot number to the MAC layer that the maximum power was reached.

Every time the MAC receives a notification from the physical layer that the maximum transmit power is reached in a timeslot, the MAC determines which CCTrCHs have allocated codes in the timeslot that reached maximum power and marks such CCTrCHs as having reached maximum power. When a CCTrCH reaches maximum power, the MAC will check whether or not it should "step down":

Stepping down: Each time a CCTrCH reaches maximum transmit power for three (3) consecutive frames, the MAC will limit the candidate TFC set to the minimum TFC set in the next common TTI boundary (common TTI to all transport channels in the CCTrCH).

After the MAC "steps down", it will consider the recovery criteria to "step up".

For stepping up, after every frame of operation of a CCTrCH at the minimum TFC set, the MAC will predict the power needed by the full TFC set of that CCTrCH in the next frame. If the predicted transmit power in all timeslots of the CCTrCH is less than the maximum allowed UE transmit power for three (3) consecutive frames, then the full TFC set can be included in the candidate TFC set. Otherwise, the minimum TFC set will be used.

That is, the MAC will either allow the full set (in terms of power) or the minimum set. This is a low cost solution that avoids the need for the MAC to determine the power needed by each TFC in each timeslot.

As to power prediction, in order to check if the full set can be supported, it is sufficient to check if the TFC that requires maximum transmit power can be supported. However, due to rate matching and puncturing used in the TDD system, the TFC that requires maximum transmit power may be different for each timeslot (i.e., each timeslot has associated with it a TFC that requires maximum transmit power). One solution for this problem is for the MAC to know the procedure used by the physical layer to "fill up" timeslots and codes. The power needed by each timeslot will depend on the TFC being used, since the transmit power is a function of the beta ($\beta$) factors and number of codes used by the TFC in the timeslot, and each TFC may have a different beta factor and different data rate (and thus, different number of codes used).

Proposed herein is a solution where the MAC predicts the transmit power in each timeslot of the CCTrCH by considering the worst case scenario, by assuming that: all the assigned codes are being used in that timeslot (all codes even if they are from different CCTrCHs); and the highest beta factor among all TFCs in the TFCS is being used.

If there are codes from different CCTrCHs in the timeslot, then different beta factors will be used for each code (each code will use the highest beta factor of the associated CCTrCH).

The above technique provides a low cost solution that avoids the need for the MAC to determine which TFC requires the most power in each timeslot.

As to the padding of the PDUs, as stated above, the requirement for padding PDUs needs to be followed only if no TFCs are available among the TFCs that do not require padding PDUs. In other words, if there are TFCs available in the candidate TFC set that do not require padding PDUs, then one of those should be selected, instead of selecting a TFC that requires padding. It should be noted that, for all TFCs that require padding, PDUs from logical channels that cannot produce padding PDUs (i.e., RLC-TM logical channels) are eliminated from the candidate TFC set when the RLC configuration requirements are checked for padding compatibility. The TFCs that require padding PDUs and are in the candidate TFC set, require padding PDUs from logical channels that can produce padding. Whether or not padding PDUs are needed for a given TFC, depends on the RLC buffer occupancy (amount of data that needs to be sent). In order to create a set with only TFCs that do not require padding PDUs, all TFCs must be tested at every TTI. However, this is an expensive solution.

It is proposed herein to determine if there are TFCs that do not require padding PDUs while performing TFC selection algorithm, as set forth below. Thus, all TFCs that satisfy the five requirements stated supra will be part of the candidate TFC set, and the requirement regarding padding PDUs will be fulfilled, whenever possible, at each TFC selection iteration.

A chosen TFC must be selected from the candidate set and must satisfy the following criteria (and in the order in which they are listed):

a) no other TFC allows the transmission of higher priority data than the chosen TFC;

b) no other TFC allows the transmission of more data from the next lower priority channels, and c) no other TFC has a lower bit rate than the chosen TFC.

BRIEF DESCRIPTION OF THE DRAWING(S)

Figure 2D:
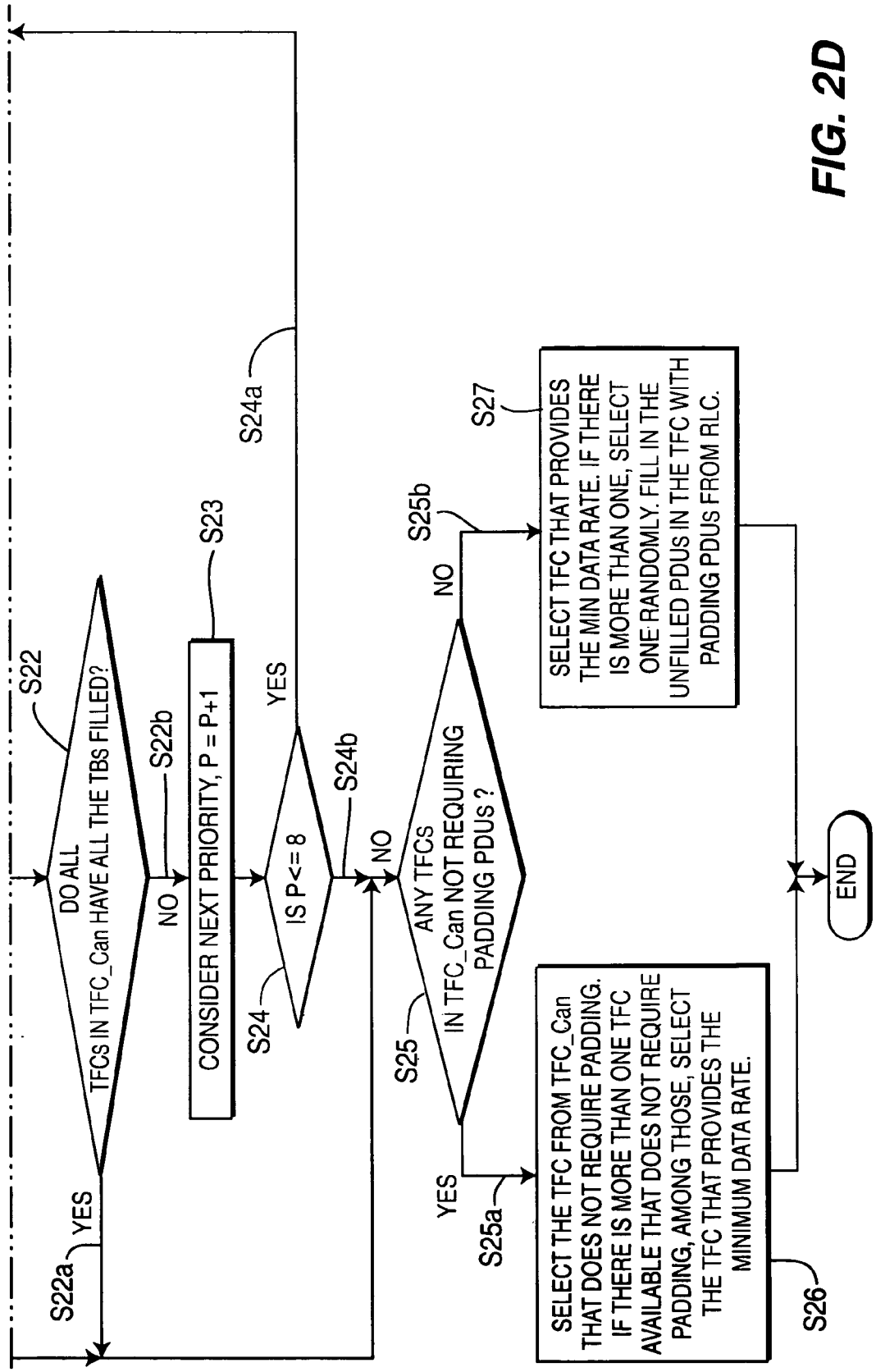

FIGS. 1A through 1D comprise a flow chart for MAC-c TFC selection algorithm implementation;

FIG. 1 shows the manner in which FIGS. 1A through 1D are arranged to form the flow chart;

FIGS. 2A through 2D comprise a flowchart for MAC-d TFC selection algorithm implementation; and FIG. 2 shows the manner in which FIGS. 2A through 2D are arranged to form the flow chart.

Figure 3:
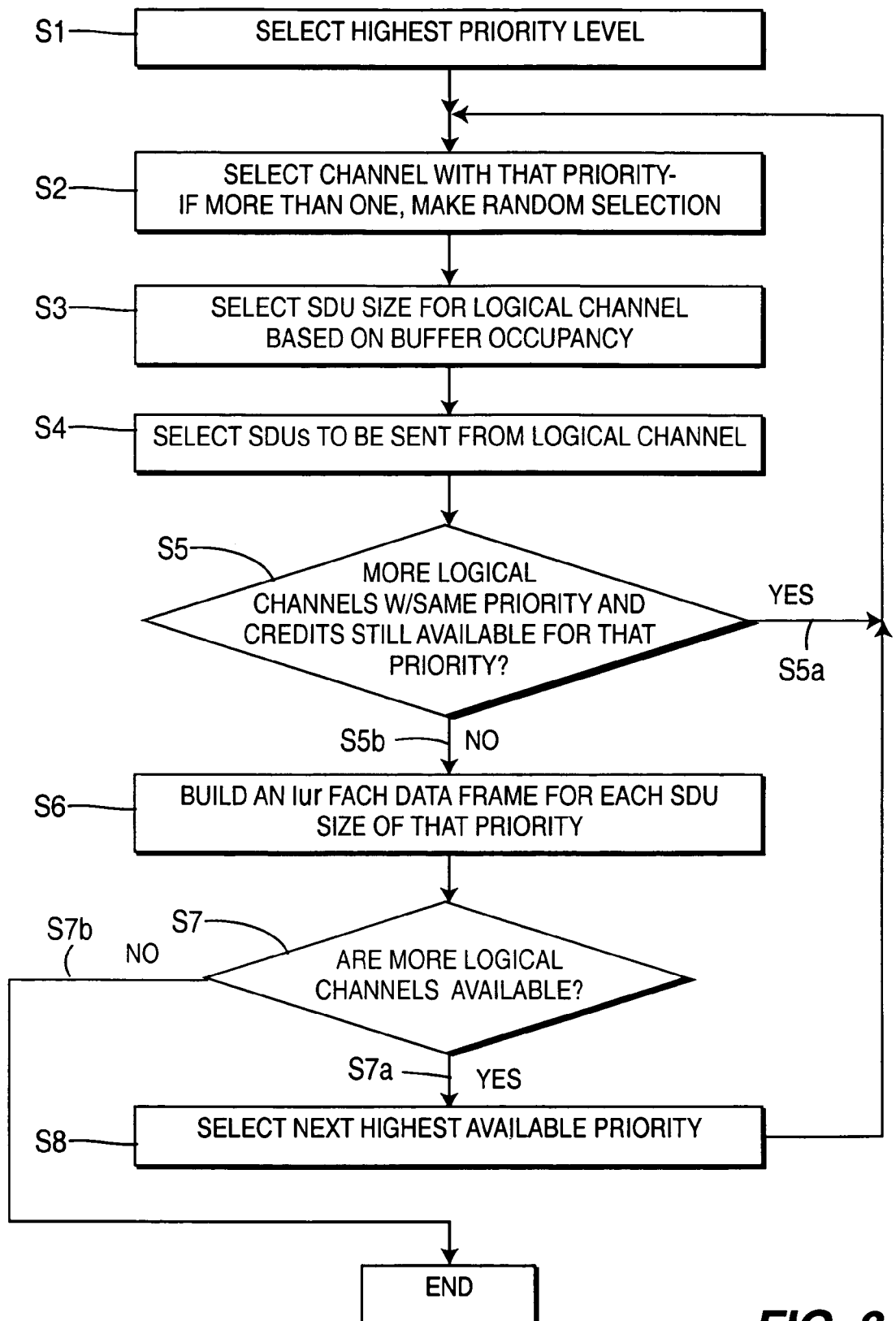

FIG. 3 is a flowchart for an RNC MAC-d SDU size selection procedure.

DETAILED DESCRIPTION OF THE PREFERRED EMBODIMENT(S)

In the description of the exemplary embodiments to follow, each logical channel has an associated MLP (MAC Logical Channel Priority). The MLP determines the priority of the logical channel. The rules described in the following paragraph are based on MLPs:

Thus, the first important point is that the algorithm iterates per logical channel priority (tries to serve logical channels of highest priority first), as opposed to per transport channel.

One solution when performing TFC selection is to determine how much data of each priority each TFC can carry (starting with the highest priority), and then select one based on the requirements (maximizing the throughput of higher priority data). However, this requires going over all TFCs in the candidate set.

The solution proposed here is to identify the amount of highest priority data that each TFC can carry, and then eliminate those that provide lower throughput from the candidate set. In the next iteration (for the next highest priority data), only the new set is considered.

However, there is still need to satisfy the "candidate set" requirement listed supra on padding PDUs. When eliminating TFCs from the set before completing the whole procedure, the final TFC selected may require padding PDUs, and the whole procedure would need to be repeated without the given TFC, until a TFC that does not require padding is found (and if no such TFC is found, the first TFC selected would be used).

The solution proposed here is to assure that at least one TFC that does not require padding remains on the candidate set. As discussed before, certain candidate sets may have no such TFC, in which case, the above stated "candidate set" requirement need not be satisfied.

Thus, if after removing the TFCs that do not maximize the throughput from the candidate set, the candidate set does not contain at least one TFC that is "filled up" (i.e., all transport blocks being used), then a TFC that does not require padding PDUs (but does not maximize throughput) is added back to the candidate set (note that the padding requirement is stronger than the throughput requirement). If there are many TFCs that could be added to the candidate set, the one that maximizes the throughput of the highest priority data is chosen. If more than one TFC that does not require padding has the same throughput for the highest priority data, then the TFC that maximizes throughput of the next highest priority data is chosen. This rule should be applied recursively for all priority levels.

The following is an example of an implementation of the MAC-d TFC selection procedure. It should be noted that the invention is broader than this example and the example should not be considered as limiting the invention.

The following is used in the algorithm below:

SDUs from logical channels with the priority p are considered data with priority p.

The candidate TFC set is referred to as TFC_Can.

Only logical channels that have buffer occupancy greater than zero shall be considered for the TFC selection.

The algorithm should run only if the TFC set has valid TFCs (TFCs with data rate greater than zero).

The following algorithm (shown in FIG. 2) is performed for MAC-d TFC selection:

After performing steps S1 through S3 to obtain candidate sets (step S1 being performed only by UEs), the routine proceeds as follows:

S4: Initialize p=1.

S5: Check if there is at least one TFC with at least one TB available in the TFC_Can (candidate TFC set).
   a. If yes, S5a, go to step S6.
   b. If no, S5b, go to step S25 (all TFCs filled, select one).

S6: Select the first TFC with at least one TB available from TFC_Can (candidate TFC set).

S7: Check if there is a logical channel with priority p such that: the logical channel has available PDUs to be sent;

the logical channel is not blocked for this TFC; and the transport channel that is mapped to that logical channel has available TBs.
  a. If yes, S7a, to go S9 and select that logical channel. If there is more than one such logical channel, select one randomly. Then go to step S10.
  b. If no, S7b, go to step S16 (no more data with priority p).
S10: Check if there is a restriction on PDU sizes for the selected logical channel.
  a. If yes, S10a, go to step S11 and check if the TB size of the transport channel is the same size as the PDU size+MAC header.
    i. If yes, S11a:
      1. Go to S13 and select PDUs from this logical channel to fill up as many available TBs as possible in the transport channel.
      2. Update logical channel information as follows:
        a. This logical channel is blocked for this TFC selection (logical channel already served).
      3. Go to S14, update TB information as follows:
        a. TBs used are not available anymore for this TFC selection.
      4. Go to step S14.
    ii. If no, S11b,
      1. Go to S8 where the logical channel is considered blocked for this TFC (PDUs do not fit the TFC).
      2. Then return to step S7.
  b. If no, S10b,
    i. go to S12 and fill up as many TBs as possible in that transport channel with bits from this logical channel.
    ii. At S14, update TB information as follows:
      1. TBs used are no longer available for this TFC selection
    iii. This logical channel is considered blocked for this TFC selection (logical channel already served).
    iv. Go to step S15.
At S15, check if all the TBs in this TFC are filled.
  a. If yes, S15a, go to step S16 (no more space in this TFC).
  b. If no, S15b, return to step S7.
At S16, compute the total optimal throughput of priority p data for this TFC, as follows:
  Let Num_Bits(p,i,j) denote the number of bits of priority p data that can be transmitted on DCH i when using TFC j (i.e., TB size times the number of TBs being sent, including any RLC and/or MAC header that is applicable and/or padding bits).
The normalized throughput of DCH i is computed as:

$$Throughput(p, i, j) = \text{Num\_Bits}(p, i, j) \cdot \frac{10\ ms}{TTI\ Length(i, j)} \qquad \text{Equation 1}$$

where TTI Length(i,j) is the TTI length of TF for TrCH i given TFC j.

The total optimal throughput of priority p data for the CCTrCH is the sum of every DCH's normalized throughput of this priority data.

$$Total\_Throughput(p, j) = \sum_i Throughput(p, i, j)$$

At S17, check if there are more TFCs in TFC_Can
  a. If yes, S17a, select the next TFC and go back to step S7.
  b. If no, S17b, (all TFCs were checked), go to step S18.
At S18, among all TFCs in TFC_Can, there is at least one TFC, say TFC k, that provides the highest "total optimal throughput" for priority p, such as:

$$k = \underset{j}{\text{argmax}}\{\text{Total\_Throughput}(p, j)\} \qquad \text{Equation 2}$$

Delete (i.e. "discard") all TFCs that provide throughput less than the one of TFC k from TFC_Can. Then go to step S19.
At S19, check if there is at least one TFC in TFC_Can that has all the TBs filled.
  a. If not, S19a, go to S20 and check if there is at least one TFC that does not belong to TFC_Can and that has all TBs filled.
    i. If yes, S20a:
      1. Go to S21 and create a set with all those TFCs, called TFC_NoPad (TFCs that do not require padding).
      2. Among all the TFCs in TFC_NoPad, select the TFC that provides highest "total optimal throughput" for priority p data.
      3. Add that TFC to TFC_Can (candidate set).
    ii. If not, S20b, continue to step S22.
  b. If yes, S19b, continue to step S22 (there is already one TFC in TFC_Can that does not require padding).
At S22, check if all TFCs in TFC_Can have all the TBs filled.
  a. If yes, S22a, go to step S25 (TFC selection is done).
  b. If no, S22b, go to step S23.
At S23, update p=p+1.
At S24 Check if p≦8
  a. If yes, S24a, return to step S5
  b. If no, S24b, go to step S25 (all priorities checked, will select one TFC).
At S25, check if there is at least one TFC in TFC_Can that does not require padding PDUs.
  a. If yes, S25a, go to step S26.
  b. If no, S25b go to step S27.
At S26, select the TFC from TFC_Can that does not require padding. If there is more than one TFC available that does not require padding, among those, select the TFC that provides the minimum data rate.
At S27, Select the TFC from TFC_Can that provides the minimum data rate. If there is more than one TFC available with the same data rate, select one randomly. Fill in the unfilled PDUs in the TFC with padding PDUs from RLC.

On the RNC side, the TFC Selection in the MAC layer is done in both MAC-c and MAC-d entities. MAC-c is located in the Controlling-RNC (C-RNC) and there is one MAC-c per cell; MAC-d is located in the S-RNC and there is one MAC-d for each UE.

In order to transfer data between S-RNC and C-RNC, forward access channel (FACH) flow control is used. Flow control allows the MAC-c (C-RNC) to control the number of SDUs (credits) that each MAC-d (S-RNC) can send for an associated priority (FACH Priority Indicator). The MAC-d selects an SDU size for each priority, and send the data to the MAC-c. The MAC-c buffers this data, before it is transmitted.

If credits=0 (e.g. due to congestion in the C-RNC), the S-RNC immediately stops transmission of MAC-c SDUs. If credits="unlimited", it indicates that the SRNC may transmit an unlimited number of MAC-c SDUs.

The following sections describe the TFC selection algorithm for RNC MAC-c (FIG. 1) and the SDU size selection algorithm for common transport channels in the RNC MAC-d.

The RNC MAC-d TFC selection algorithm is similar to that for the UE MAC-d, with the exception that on the RNC side there is no restriction on the transmit power, and hence will not be presented here. The procedure discussed in the previous section applies to MAC-d in both UE and RNC sides.

The MAC specification does not specify any requirements for TFC selection on RNC. However for the UE to decode the data properly, there are some requirements that must be followed. These requirements are summarized below.

Before selecting a TFC for the case of MAC-c, the set of valid TFCs must be established. This set is referred to as the "candidate set". All TFCs in the candidate set must:

1. belong to the TFCS;
2. respect the TTI compatibility—the transport format (TF) of a TrCH cannot change in the middle of the TTI of the TrCH; and
3. be compatible with the RLC configuration.

The chosen TFC must be selected from the candidate set and must satisfy the following criteria in the order in which they are listed below:

1. No other TFC allows the transmission of more highest priority data than the chosen TFC.
2. No other TFC allows the transmission of more data from the next lower priority logical channels. This criterion is applied recursively for the remaining priority levels.
3. No other TFC has a lower bit rate than the chosen TFC.
4. Must respect "first in first out" within each priority for data received from MAC-d.

For the MAC-c procedure, the data that is received from MAC-d is buffered in MAC-c. This can be done by either having one queue per UE, or one queue for all the UEs, or one queue for each priority. It is proposed to have one queue per priority, as doing so would make it easier to maintain first in first out order. The first approach would require the buffer to be time stamped in order to maintain the order, while the second approach would require coordination of the priorities.

For blocking purposes, MAC-c can schedule data on any of the FACHs mapped on the coded composite channel. If data from a logical channel is sent on a transport channel with TTI of length 't', data from the same logical channel should not be sent on other transport channels, for the duration of 't' as this can lead to an out-of-order problem in the receiving side RLC (i.e., the UE side).

For a CCCH (Common Control Channel) this problem can be solved by blocking the channel for transmission for a duration equal to the TTI of the last transmitted transport channel (i.e., data from that logical channel will not be sent during that TTI).

For buffered data (data received from MAC-d), this problem can be solved by blocking the data of a given priority. However, this approach would lead to under utilization of system resources as a greater amount of data is blocked even if it is not necessary, and leads to a delay in the transmission of data from other UEs of the same priority. To avoid this, data of a priority from a UE is blocked for a period 't', if data from this UE of that priority is sent on a transport channel with TTI period 't'. This increases the amount of data that can be sent out from all UEs and also solves the out of order problem.

As for padding, MAC-c can request padding PDUs only from CCCH RLC entity. If CCCH is blocked and if padding PDUs are required, MAC-c requests only padding PDUs from RLC.

The following is an example of an implementation of the RNC MAC-c TFC Selection procedure. The invention is much broader and the invention should not be limited in scope based on the example given but on the scope of the claims.

In this MAC-c algorithm, algorithm:
A buffer with transferred PDUs is referred to as a "logical channel".
The candidate TFC set is referred to as TFC_Can
Only logical channels that have buffer occupancy greater than zero shall be considered for the TFC selection
The algorithm should run only if the TFC set has valid TFCs (TFCs with data rate greater than zero)
Making reference to FIGS. 1A to 1D, the following steps are performed for the MAC-c TFC selection algorithm:

S1. Initialize p=1.
S2. Check if there is at least one TFC with at least one TB available in the TFC_Can (candidate TFC set).
  a. If yes, S2a, go to step S3.
  b. If no, S2b, go to step S26 (all TFCs filled, will select one).
S3: Select the first TFC with at least one TB available from TFC_Can (candidate TFC set)
S4: Check if there is a logical channel with priority p such that: the logical channel has available PDUs to be sent; if the selected logical channel is a CCCH, the logical channel is not blocked for the selected TFC; if the selected logical channel is of transferred PDUs then check if; there is a least one PDU that is not blocked for the selected TFC; and the selected logical channel is not blocked for this TFC.
  a. If yes, S4a, go to S5 and select that logical channel. If there is more than one such logical channel, select one randomly. Go to step S6.
  b. If no, S4b, go to S17 (no more data with priority p).
S6: Check if there is a restriction on PDU sizes for the selected logical channel.
  a. If yes, S6a, go to S7 and check if there is a TB available with the same size as the PDU size+MAC header.
    i. If yes, S7a, go to S8 and:
      1. select the transport channel with that TB size. If more than one are available, select a transport channel that gives the maximum available data rate, as follows:
      MAX {(number of available TBs)/TTIsize}; and
      2. select PDUs that are not blocked from this logical channel to fill up as many available TBs as possible in the transport channel. PDU selection must respect FIFO; blocked PDUs must be skipped.
      3. Update buffer information as follows:
        a. PDUs selected are not available for this TFC selection, then go to S11 and:
      Update TB information as follows:
        a. TBs used are not available anymore for this TFC selection.
      Then go to step S14.
    ii. If no, S7b, go to S9 to perform:
      1. This logical channel is considered blocked for this TFC (since PDUs do not fit the TFC).
      2. Then return to step S4.

b. If no, S6*b*, go to S10 and:
  i. select a transport channel that gives the maximum available data rate, as follows:
  MAX {(number of available TBs*TBsize)/TTIsize}.
  ii. Fill up as many TBs as possible in that transport channel with bits from this logical channel.
  iii. Update buffer information as follows:
   1. bits used are not available anymore for this TFC selection and should not be counted in the buffer occupancy.
  iv. Then go to step S11 to update TB information as follows:
   1. TBs used are not available anymore for this TFC selection.
  v. Then go to step S12.
 2. If the selected logical channel is a CCCH, S12*a*, go to S14 and:
  Consider the CCCH to be blocked for this TFC during this TFC selection (for the next steps of the TFC selection for this TTI).
 3. If the selected logical channel is not a CCCH, S12*b*, go to S13 to determine:
  If the selected logical channel is of transferred PDUs, S13*a*, then go to S15, to assure:
   all the other PDUs that:
   are in the same buffer (i.e., same priority); and
   have the same UE ID as the UE ID of PDU(s) selected are considered blocked for this TFC during this TFC selection (for the next steps of the TFC selection for this TTI).
  5. If the selected logical channel is not of transferred PDUs, S13*b*, go directly to S16.
At S16, check if all the TBs in this TFC are filled.
 a. If yes, S16*a*, go to step S17 (no more space in this TFC).
 b. If no, S16*b*, return to step S4.
At S17, compute the total optimal throughput of priority p data for this TFC, as follows:
 Let Num_Bits(p,i,j) denote the number of bits of priority p data that can be transmitted on FACH i when using TFC j (i.e., TB size times the number of TBs being sent, including any RLC and/or MAC header that is applicable and/or padding bits).
 The normalized throughput of FACH i is computed as $$Throughput(p, i, j) = \text{Num\_Bits}(p, i, j) \cdot \frac{10 \text{ ms}}{TTI \ Length(i, j)} \qquad \text{Equation 3}$$

where TTI Length(i,j) is the TTI length of TF for TrCH i given TFC j. The total optimal throughput of priority p data for the CCTrCH (S-CCPCH) is the sum of every FACH's normalized throughput of this priority data.

$$Total\_Throughput(p, j) = \sum_i Throughput(p, i, j)$$

At S18, check if there are more TFCs in TFC_Can.
 a. If yes, S18*a*, select the next TFC and return to step S4.
 b. If no, S18*b*, (all TFCs were checked), go to step S19.

At S19, among all TFCs in TFC_Can, there is at least one TFC, say TFC k, that provides the highest "total optimal throughput" for priority p, such as:

$$k = \underset{j}{\operatorname{argmax}} \{ Total\_Throughput(p, j) \} \qquad \text{Equation 4}$$

Delete all TFCs that provide throughput less than the selected TFC k from TFC_Can.
At S20, check if there is at least one TFC in TFC_Can that has all the TBs filled (does not require padding).
 a. If not, S20*a*, go to S21 and check if there is at least one TFC that does not belong to TFC_Can and that has all TBs filled.
  i. If yes, S21*a*, go to S22 to:
   1. Create a set with all those TFCs, called TFC_NoPad (TFCs that do not require padding);
   2. among all the TFCs in TFC_NoPad, select the TFC providing the highest "total optimal throughput" for priority p data; and
   3. add that TFC to TFC_Can.
  ii. If not, S21*b*, continue to step S23.
 b. If yes, S20*b*, continue to step S23 (there is already one TFC in TFC_Can that does not require padding).
At S23, check if all TFCs in TFC_Can have all the TBs filled.
 a. If yes, S23*a*, go to step S26 (TFC selection is done).
 b. If no, S23*b*, go to step S24.
At S24, update p=p+1, then go to S25 to check if p<=8.
 a. If yes, S25*a*, return to step S2.
 b. If no, S25*b*, go to step S26 (all priorities checked, select one TFC).
At S26, check if there is at least one TFC in TFC_Can that does not require padding PDUs.
 a. If yes, S26*a*, go to step S27.
 b. If no, S26*b*, go to step S28.
At S27, select the TFC from TFC_Can that does not require padding. If there is more than one TFC available that does not require padding, among those, select the TFC that provides the minimum data rate.
At S28, select the TFC from TFC_Can that provides the minimum data rate.
 If there is more than one TFC available with the same number of bits, select one randomly. Fill in the unfilled PDUs in the TFC with padding PDUs from RLC (CCCH).
 After either S27 or S28, go to S29.
At S29, if the CCCH is used in this TFC, consider the CCCH to be blocked for all TFCs for a period of time equal to the TTI of the transport channel selected.
At S30, for each logical channel with transferred PDUs (i.e., for each buffer with a specific priority) used in the selected TFC, each PDU that is in that buffer and has the UE ID equal to the UE ID of a PDU selected for this TFC is considered to be blocked for all TFCs for a period of time equal to the TTI of the transport channel selected for that logical channel.
 FIG. 1, which shows the flowchart for the MAC-c TFC selection algorithm implementation, includes more steps than the algorithm of FIG. 2.
 The MAC-d can be configured with a set of allowed SDU sizes (the allowed sizes depend on the TFCS of the S-CCPCH (Secondary Common Control Channel)) for each common transport channel priority indicator (FACH priority). A FACH flow control frame is used by the C-RNC to control the user data flow. It may be generated in response to a FACH Capacity Request or at any other time. The FACH Flow control frame shall contain the number of credits the S-RNC MAC-d entity is allowed to transmit.

For each logical channel, there is an associated FACH priority. The MAC-d selects a SDU size (from within the configured set) for each logical channel, depending on the logical channel buffer occupancy (BO) and the number of available credits for that FACH priority. MAC-c SDUs of same size and same FACH priority may be transmitted in the same FACH data frame.

The SDU size selection for a logical channel depends on the corresponding RLC configuration, the logical channel BO, and the number of available credits for that FACH priority.

For a given BO, there may be a variable number of credits needed for each SDU size. If the number of credits required multiplied by the SDU size does not exactly match the BO, then it will require some overhead (RLC padding). An SDU size that minimizes this overhead is selected, to maximize throughput. However, that may require selecting a size that requires an increased number of credits. It should be noted that the more the number of credits is requested, the more times the MAC header is added, resulting in more overhead.

Since there is no closed form equation to determine which option is better (minimizing the RLC padding overhead or minimizing the number of credits for a given BO), the latter (minimizing the number of credits being used for a given BO) is selected because, by selecting a size that requires a lesser number of credits, more credits are available for future use, which proves to be extremely useful in a fully loaded system. Also, if the BO is very large compared with the SDU sizes, then the solution minimizes both the overhead and the number of credits.

The following is an example of an implementation of the RNC MAC-d SDU size selection procedure. The invention is not limited to the following example, and the invention is intended to be limited only by the appending claims.

In order to send SDUs to the MAC-c, MAC-d follows the following procedure (See FIG. 3):

S1: Select the highest priority (i.e., highest MLP).
S2: Select a logical channel with that priority. If there is more than one logical channel with that priority, select one randomly.
S3: Based on the buffer occupancy of the logical channel, select the SDU size to be used for that logical channel, as follows:
  Based on the number of "credits" available in MAC-d, determine the amount of information bits that can be transmitted by using each PDU size (not including padding bits). For each PDU size, the amount of information bits is given by:
  MIN (BO, credits×PDU size).
  Select the PDU size that gives the maximum amount of information bits. If more than one PDU size gives the same maximum amount of information bits, select the PDU size that gives the minimum number of credits required to send the given maximum amount of information bits. If more than one PDU size gives the same minimum number of credits, select the smallest PDU size.
S4: Select the SDUs to be sent from that logical channel. Many SDUs can be sent but only a single SDU size is allowed for that logical channel. The credits allowed must be respected when selecting the number of SDUs to be sent.
S5: Check if there are more logical channels with the same priority and if there are still credits available for that priority
  If yes, S5a, return to S2.
  If no, S5b, go to S6.
At S6, build one "Iur" FACH data frame for each SDU size (for a given priority). Note that the SDU size is the same for a given logical channel, but may be different for different logical channels of the same priority. Thus, if there are n logical channels with that priority, there will be at least one (1) and at most n FACH data frames (one for each size). It should also be noted that the order of the SDUs for each logical channel must be maintained inside the data frame.
At S7, check if there are more logical channels available.
  If yes, S7a, go to S8 to select the next highest priority available and go back to S2.
  If no, S7b, the procedure is over.

In the previous sections, the information needed in order to perform TFC selection was described. For the interaction between MAC and RLC, both logical channel mode-based configuration information (static) and buffered data information (dynamic) are needed.

As per the MAC Protocol Specification (3GPP TS 25.321) and the RLC Protocol Specification (3GPP TS 25.322), the RLC provides the MAC with the buffer occupancy (BO), which is the total amount of data buffered in the RLC. However, since the MAC needs more information from the RLC in order to perform TFC selection, the RLC protocol specification (3GPP TS 25.322) also states that the RLC needs to provide "RLC Entity Info" to the MAC. The RLC protocol specification (3GPP TS 25.322) does not specify what the "RLC Entity Info" must contain.

In this section, the contents of the "RLC Entity Info" will be described. Since this information is used to "restrict" the selection of the TFC, this information is referred to as the TFC Restriction Variables.

The TFC restriction variables provide information about the PDUs and/or SDUs buffered in the RLC that are available for transmission in the next TTI.

For unacknowledged and transparent modes, the MAC specifies the PDU size on a per TTI basis. Therefore, the RLC cannot create PDUs ahead of the TTI, and only information based on the buffered SDUs can be provided by the RLC in advance of transmission. For an acknowledged mode, the PDU size is fixed, and therefore information based on the buffered PDUs can be provided by the RLC.

Note that the TFC restriction variables can contain the RLC mode itself. However, since providing the RLC mode requires the MAC to make assumptions about the RLC buffered data characteristics based on the RLC mode, then the data characteristics themselves are provided instead.

Since TFC selection depends upon the amount of data that is available for transmission in a given TTI, the TFC restriction variables include the SDU/PDU size and the number of SDUs/PDUs buffered in the RLC.

Depending on the RLC mode, and also in order to avoid data transmission conflicts, only some of the data buffered in the RLC may be available for transmission.

For all RLC modes, the sizes and UE Id Types of all of the PDUs transmitted to the MAC in one TTI must be the same. The information reported to the MAC must guarantee that the TFC is selected so that these two restrictions are not violated. Therefore, only information for SDUs and PDUs that are the same size and UE Id Type is provided. Since the data must be transmitted in the order it was received, the RLC reports only the number of consecutive SDUs/PDUs in the RLC transmission buffer (starting from the oldest SDU/PDU) that are the same size and the same UE Id Type.

For transparent mode with segmentation configured, only one SDU can be transmitted per TTI, and therefore the RLC will report that only one SDU is available for transmission.

For acknowledged mode, depending upon the RLC configuration, a logical channel can carry RLC SDU data (received from the upper layer) and/or RLC peer-to-peer control data. The amount of available PDU data for an acknowledged mode logical channel is therefore restricted by the type of RLC data that it can support. For acknowledged mode logical channels that support transmission of RLC SDUs (received from the upper layer), the amount of available PDU data is also restricted by the size of the logical channel's RLC transmit window. Note that the RLC transmit window size is statically configured in the RLC.

For TFC selection, the MAC needs to know how much of the TB is taken up by the MAC header. Since the TB header size depends on the UE Id Type, then the TFC restriction variables also contain the UE Id Type. Note that the MAC protocol specification (3GPP TS 25.321) states that the UE Id Type is provided by the RLC to the MAC for each data transmission.

Since the TFC contains information about the number of PDUs that the MAC must request from the RLC then the MAC needs to know whether or not the SDUs buffered in the RLC can be segmented. Therefore the TFC restriction variables include a segmentation indicator. Note that this indicator is statically configured in the RLC.

As mentioned in the previous sections, padding information needs to be known by the MAC in order to be able to perform TFC selection. Since padding is only supported in certain RLC modes (UM and AM modes only), a padding PDU indicator is also included in the TFC restriction variables.

The foregoing is a description of a method and exemplary algorithms for procedures used by the MAC layer for TFC selection to schedule data transmission. The 3GPP UMTS stated above as the context for the invention is only by way of example, and, the invention can be modified to serve other related standards and modes of data transmission. All such modifications are envisaged to be within the scope of the present invention.

The blocking and unblocking techniques described above are extremely advantageous for use in a wireless network employing time division duplex (TDD) for communications. However, the above techniques can be employed in a frequency division duplex (FDD) type network.

All other aspects of the invention are applicable to all operating modes of UMTS.

What is claimed is:

1. A method for scheduling data transmission in a wireless communication network which eliminates a need to determine power requirements for each transport format combination (TFC) in each time slot, said network including at least a physical layer and a medium access control (MAC) layer, comprising:
   said physical layer:
   monitoring transmit power in a time slot;
   determining that maximum power has been reached in the time slot; and
   sending a notification to the MAC layer that maximum power has been reached, together with the time slot number;
   said MAC layer:
   determining which coded composite transport channels (CCTrCHs) have allocated codes in the time slot that reached maximum power;
   marking such CCTrCHs as having reached maximum power; and
   limiting a candidate or transport format combination (TFC) set in a next common transmit time interval (TTI) boundary.

2. The method of claim 1 wherein the limiting step further includes:
   detecting that the maximum transmit power has occurred for a given number of consecutive frames before limiting said candidate TFC set.

3. The method of claim 2 wherein the number of consecutive frames is preferably three (3).

4. The method of claim 1 further comprising:
   said MAC layer:
   predicting a power needed by the full TFC set of a CCTrCH will be required in the next frame responsive to every frame of operation of a CCTrCH at the limited TFC set;
   comparing the predicted transmit power in all time slots of the CCTrCH; and
   providing the full TFC set in the candidate TFC set when predicted transmit power in all time slots of the CCTrCH is less than the maximum allowed UE transmit power.

5. The method of claim 4, wherein the comparing step includes:
   performing the comparing step for a given number of consecutive frames in order to include the full TFC set in the candidate TFC set.

6. The method of claim 5, wherein the given number of consecutive frames is three (3).

7. The method of claim 4, wherein predicting transmit power in each time slot comprises considering a worst case scenario by assuming that all assigned codes are being used in that time slot even if they are from different CCTrCHs.

8. The method of claim 7, wherein a beta factor used for each code is a highest beta factor of the CCTrCH among all TFCs in the TFC set being used.

9. The method of claim 1, wherein a TFC is selected from the candidate set such that:
   no other TFC allows transmission of higher priority data in a chosen TFC;
   no other TFC allows transmission of more data from the next lower priority channels, and
   no other TFC has a lower bit rate than the chosen TFC.

10. The method of claim 1 wherein said MAC layer is a MAC-dedicated channel (MAC-d) type.

11. The method of claim 4 wherein the providing step further includes:
   providing the full TFC set only if the full TFC set can be supported.

12. The method of claim 1 wherein said network employs a time division duplex (TDD) technique for communication.

13. A method for scheduling data transmission in a wireless communication network which eliminates a need to determine power requirements for each transport format combination (TFC) in each time slot, said network including at least a physical layer and a medium access control (MAC) layer, comprising:
   said physical layer:
   monitoring transmit power in a time slot;
   determining that maximum power has been reached in the time slot; and sending a notification to the MAC layer that maximum power has been reached, together with the time slot number; and said MAC layer:

selecting a TFC from either a full TFC set or a limited TFC set based on a power notification from the physical layer.

14. The method of claim 13 wherein said MAC layer is a MAC-dedicated channel (MAC-d) type.

15. Apparatus for scheduling data transmission in a wireless communication network which eliminates a need to determine power requirements for each transport format combination (TFC) in each time slot, said network including at least a physical layer and a medium access control (MAC) layer, comprising:

said physical layer comprising:

means for monitoring transmit power in a time slot;

means for determining that a maximum power has been reached in the time slot; and means for sending a notification to the MAC layer that maximum power has been reached, together with the time slot number;

said MAC layer comprising:

means for determining which coded composite transport channels (CCTrCHs) have allocated codes in the time slot that reached maximum power;

means for marking such CCTrCHs as having reached maximum power; and means for limiting a candidate or transport format combination (TFC) set in a next common transmit time interval (TTI) boundary.

16. The apparatus of claim 15 wherein the means for limiting further comprises:

means for detecting that the maximum transmit power has occurred for a given number of consecutive frames; and means responsive to said detecting means for limiting said candidate TFC set.

17. The apparatus of claim 16 wherein the means for detecting determines that maximum transmit power has occurred for three (3) consecutive frames.

18. The apparatus of claim 15 wherein said MAC layer is a MAC-dedicated channel (MAC-d) type.

19. The apparatus of claim 15 wherein said network employs a time division duplex (TDD) technique for communications.

20. The apparatus of claim 15 further comprising:

said MAC layer comprising:

means for predicting a power needed by the full TFC set of a CCTrCH in the next frame responsive to every frame of operation of a CCTrCH at the limited TFC set;

means for comparing the predicted transmit power in all time slots of the CCTrCH; and means for providing the full TFC set in the candidate TFC set when predicted transmit power in all time slots of the CCTrCH is less than a maximum allowed transmit power of a user equipment (UE).

21. The apparatus of claim 20 wherein the comparing means comprises:

means for performing the comparing step for a given number of consecutive frames in order to include the full TFC set in the candidate TFC set.

22. The apparatus of claim 21, wherein means for including includes the full TFC set in the candidate TFC set responsive to said comparing means detecting that the predicted transmit power is less than the maximum allowed power for three (3) consecutive frames.

23. The apparatus of claim 20 wherein the means for predicting transmit power in each time slot comprises:

means for considering a worst case scenario by assuming that all assigned codes are being used in that time slot even if they are from different CCTrCHs.

24. The apparatus of claim 23 wherein a beta factor used for each code is a highest beta factor of the CCTrCH among all TFCs in the TFC set being used.

25. The apparatus of claim 15 further comprising:

means for selecting a TFC from the candidate TFC set employing the criteria that:

no other TFC allows transmission of higher priority data than a chosen TFC;

no other TFC allows transmission of more data from the next lower priority channels, and no other TFC has a lower bit rate than the chosen TFC.

26. The apparatus of claim 20 wherein the means for providing further comprises:

means for providing the full TFC set only if the full TFC set can be supported.

27. The apparatus of claim 15 configured for use in a user equipment (UE) or a radio network controller (RNC).

28. Apparatus for scheduling data transmission in a wireless communication network which eliminates a need to determine power requirements for each transport format combination (TFC) in each time slot, said network comprising:

at least a physical layer and a medium access control (MAC) layer;

said physical layer comprising:

means for monitoring transmit power in a time slot means for determining that maximum power has been reached in the time slot; and means for sending a notification to the MAC layer that maximum power has been reached, together with the time slot number;

said MAC layer comprising:

means for providing one of a full TFC set and limited TFC set based on a power notification from the physical layer.

29. The apparatus of claim 28 configured for use in a user equipment (UE) or a radio network controller (RNC).

* * * * *

UNITED STATES PATENT AND TRADEMARK OFFICE
CERTIFICATE OF CORRECTION

PATENT NO. : 7,058,032 B2  Page 1 of 1
APPLICATION NO. : 10/742539
DATED : June 6, 2006
INVENTOR(S) : Iacono et al.

It is certified that error appears in the above-identified patent and that said Letters Patent is hereby corrected as shown below:

ON THE TITLE PAGE

At section (73), page 1, left column, line 1, Assignee:, delete "InterDigital Technology, Wilmington, DE (US)" and insert therefor -- InterDigital Technology Corporation, Wilmington, DE (US)--.

IN THE DRAWINGS

Figure 1D:
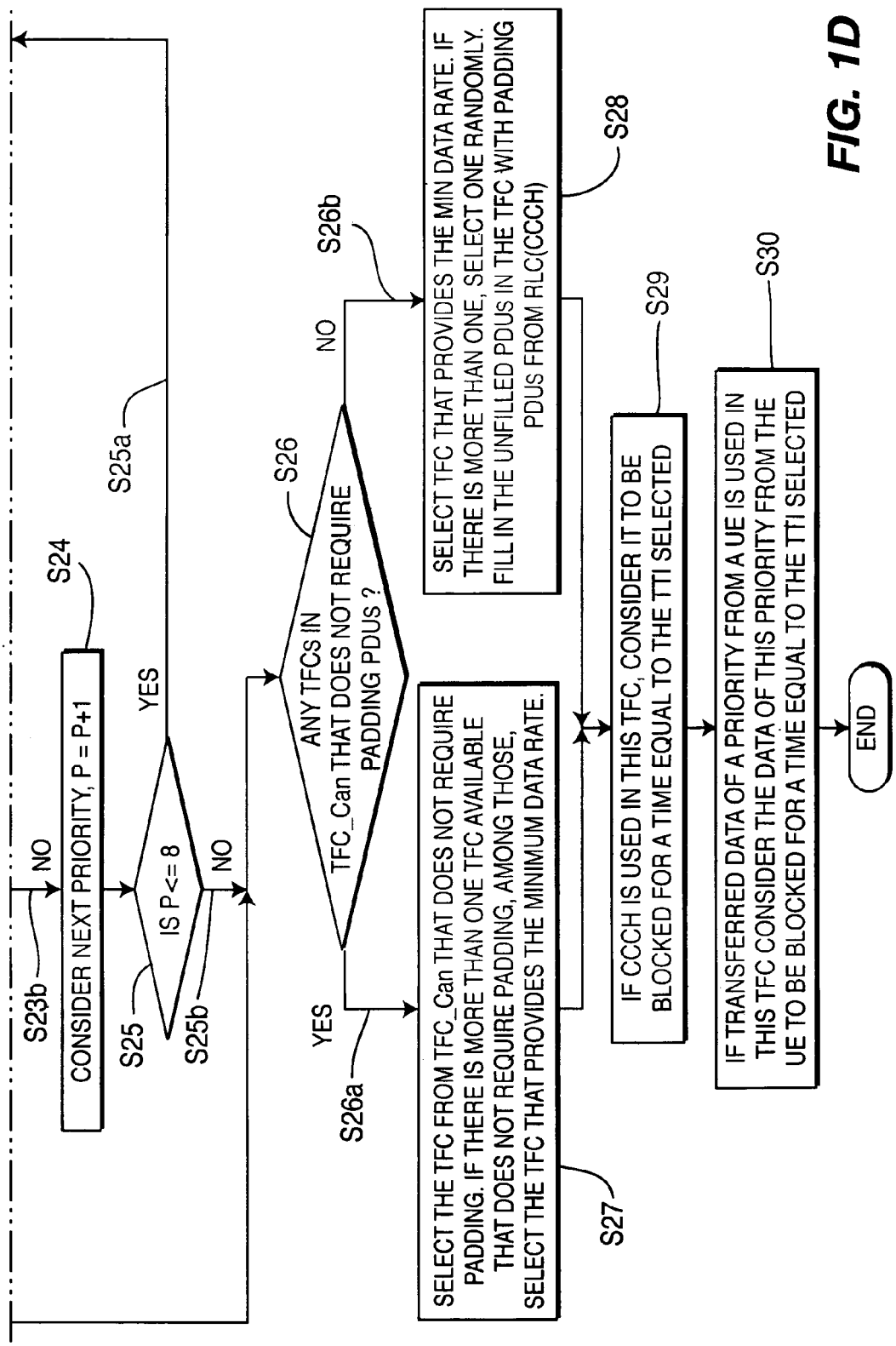

At sheet 4, FIG. 1D, item S26, line 2, after the word "THAT", delete "DOES" and insert therefor --DO--.

IN THE SPECIFICATION

At column 8, line 63, after the words "priority, and", delete "send" and insert therefor --sends--.

At column 9, line 1, after the words "that the", delete "SRNC" and insert therefor --S-RNC--.

At column 10, line 35, after the words "there is", delete "a" and insert therefor --at--.

At column 13, line 6, after the word "selects", delete "a" and insert therefor --an--.

Signed and Sealed this

First Day of May, 2007

JON W. DUDAS
*Director of the United States Patent and Trademark Office*